United States Patent Office.

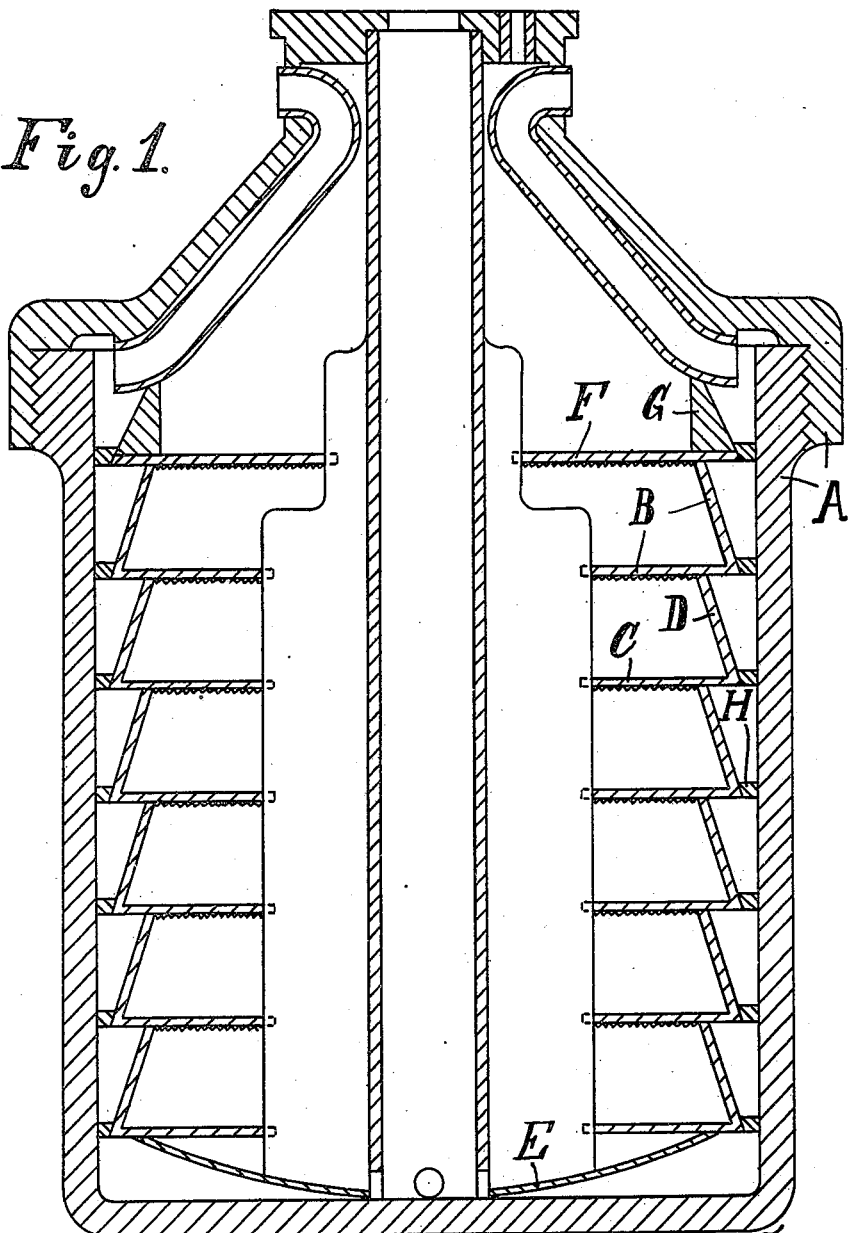

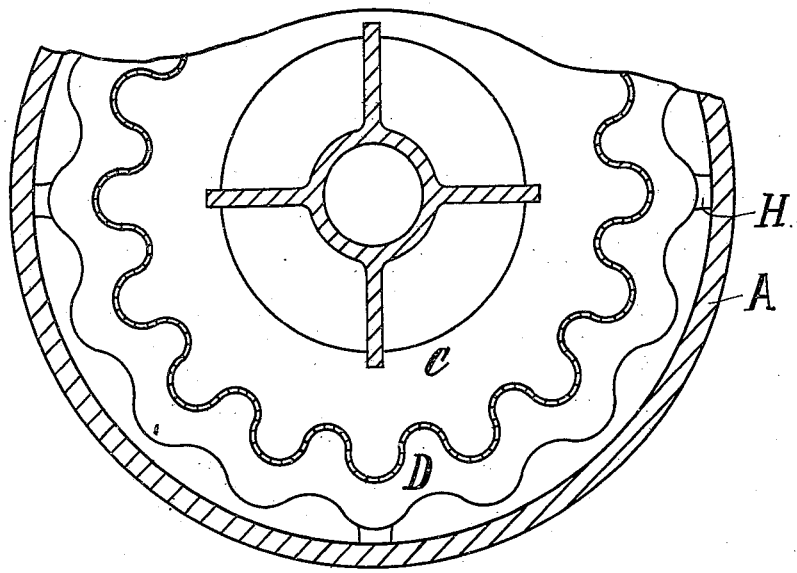
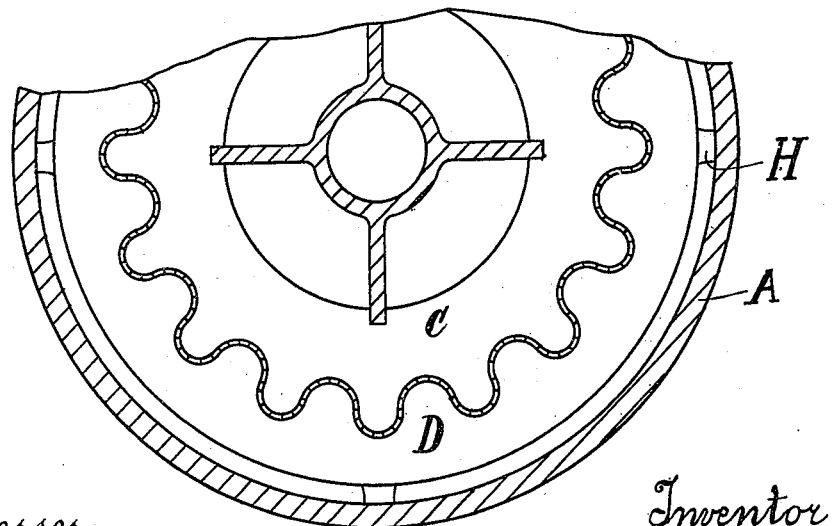

FRANS OSKAR NILSSON, OF STOCKHOLM, SWEDEN.

CENTRIFUGAL LIQUID-SEPARATOR.

SPECIFICATION forming part of Letters Patent No. 670,327, dated March 19, 1901.

Application filed June 13, 1899. Serial No. 720,430. (No model.)

*To all whom it may concern:*

Be it known that I, FRANS OSKAR NILSSON, a subject of the King of Sweden and Norway, and a resident of Stockholm, Sweden, have invented a new and useful Improvement in Centrifugal Separator-Drums, of which the following is a specification, reference being had to the drawings accompanying and forming a part hereof.

The present invention relates to an improvement in centrifugal separator-drums, more especially for the treatment of milk, and has for its purpose partly to effect a quick and efficient skimming and partly to collect slimy substances and other impurities in the milk in such a manner that they can afterward be readily removed from the partitions.

The invention consists in the construction and arrangement of parts hereinafter described and claimed.

In the accompanying drawings, Figure 1 shows a vertical section of a separator-drum according to this invention. Fig. 2 shows a horizontal section of the same, and Fig. 3 shows a horizontal section of a modification thereof.

In the usual centrifugal vessel A there are superposed on one another a number of rings B, forming a kind of perforated wall through which the skim-milk is forced out. The rings, which form the object of the invention, are composed of one lower annular disk C, which is flat, and one upper ring D, which is formed as the frustum of a cone, with the difference that its periphery is provided with corrugations, preferably commencing at the disk and increasing toward the edge, as seen in Figs. 1 and 3. The periphery of the rings may eventually be corrugated in such a manner that a uniformly conical corrugated surface is produced, the base-line of the cone having the appearance shown in Fig. 3. The upper edge of the ring may be finely beaded in order that the skim-milk may be forced out between these beadings and the flat part of the superposed ring, while slime and the like will accumulate at the inner walls of the rings and adhere to them. These rings are inserted loosely on top of one another, either as shown in Fig. 1 or with the conical part downward, and are clamped together between a flexible bowl or dished disk E, located at the bottom of the centrifugal vessel, and an upper disk F, which by means of the ring G is pressed down on the rings by the upper part of the centrifugal vessel. Lugs or projections H may be provided for centering the rings. By the corrugations of the rings the result is gained that the cream which accompanies the milk through the beaded edges and which would be liable to accumulate on the outer sides of the rings and after a short while act as a hindrance to the passage of the skim-milk is conducted back into the centrifugal vessel by the corrugations of the next ring above.

Having now described my invention, what I claim as new, and desire to secure by Letters Patent, is—

1. The combination with a centrifugal separator-drum, of a series of rings superposed on one another, said rings consisting of a flat annular disk to the outer edge of which is fastened one edge of a conical ring provided with transversal corrugations, substantially as and for the purpose set forth.

2. The combination with a centrifugal separator-drum, of a series of rings superposed on one another, said rings consisting of a flat annular disk to the outer edge of which is fastened one edge of a conical ring provided with transversal corrugations, the free edge of said ring being indented, substantially as and for the purpose set forth.

In witness whereof I have hereunto set my hand in presence of two witnesses.

FRANS OSKAR NILSSON.

Witnesses:
GUSTAF TSFALT,
GERDA LINDKVIST.